United States Patent
Proctor

(10) Patent No.: US 10,299,218 B2
(45) Date of Patent: *May 21, 2019

(54) SYSTEM AND METHOD FOR COORDINATION OF WIRELESS MAINTENANCE CHANNEL POWER CONTROL

(71) Applicant: IPR Licensing, Inc., Wilmington, DE (US)

(72) Inventor: James A. Proctor, Indialantic, FL (US)

(73) Assignee: IPR Licensing, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/471,603

(22) Filed: Mar. 28, 2017

(65) Prior Publication Data

US 2017/0215150 A1    Jul. 27, 2017

Related U.S. Application Data

(60) Continuation of application No. 13/615,848, filed on Sep. 14, 2012, now Pat. No. 9,655,062, which is a
(Continued)

(51) Int. Cl.
*H04B 7/00* (2006.01)
*H04W 52/16* (2009.01)
(Continued)

(52) U.S. Cl.
CPC ....... *H04W 52/16* (2013.01); *H04W 28/0221* (2013.01); *H04W 40/08* (2013.01);
(Continued)

(58) Field of Classification Search
CPC .................................................... H04W 52/16
See application file for complete search history.

(56) References Cited

U.S. PATENT DOCUMENTS

| 5,696,766 A | 12/1997 | Yeung et al. |
| 5,715,521 A | 2/1998 | Fukasawa et al. |

(Continued)

FOREIGN PATENT DOCUMENTS

| EP | 1 017 187 | 7/2000 |
| EP | 1 039 657 | 9/2000 |

(Continued)

OTHER PUBLICATIONS

Association of Radio Industries and Business (ARIB), "Specification of Air-Interface for 3G Mobile System," vol. 3, Ver. 1.0, Issued Dec. 1997, Revised Jan. 1999.
(Continued)

*Primary Examiner* — Gerald A Smarth
(74) *Attorney, Agent, or Firm* — Volpe and Koenig, P.C.

(57) ABSTRACT

In a wireless communication system, there are several wireless channels used for communication between users and a base station. Channel characteristics may be defined by whether a channel is carrying traffic data and the timing of the channel transmissions with respect to channels not carrying traffic data. Different power levels between channels carrying traffic data or not may be defined and individual power levels of each channel may be amended based on individual power level command responses.

27 Claims, 6 Drawing Sheets

Related U.S. Application Data division of application No. 12/938,864, filed on Nov. 3, 2010, now abandoned, which is a division of application No. 10/170,015, filed on Jun. 11, 2002, now abandoned.

(60) Provisional application No. 60/297,839, filed on Jun. 13, 2001.

(51) Int. Cl.

| | | |
|---|---|---|
| H04W 52/28 | (2009.01) | |
| H04W 52/32 | (2009.01) | |
| H04W 52/02 | (2009.01) | |
| H04W 28/02 | (2009.01) | |
| H04W 40/08 | (2009.01) | |
| H04W 52/24 | (2009.01) | |
| H04W 52/44 | (2009.01) | |

(52) U.S. Cl.
CPC ..... *H04W 52/0219* (2013.01); *H04W 52/241* (2013.01); *H04W 52/243* (2013.01); *H04W 52/248* (2013.01); *H04W 52/287* (2013.01); *H04W 52/322* (2013.01); *H04W 52/325* (2013.01); *H04W 52/0238* (2013.01); *H04W 52/0245* (2013.01); *H04W 52/44* (2013.01); *Y02D 70/00* (2018.01); *Y02D 70/1222* (2018.01)

(56) References Cited

U.S. PATENT DOCUMENTS

| | | |
|---|---|---|
| 5,822,359 A | 10/1998 | Bruckert et al. |
| 5,893,036 A | 4/1999 | Trandai et al. |
| 6,067,458 A * | 5/2000 | Chen .................. H04W 52/267 455/39 |
| 6,108,374 A | 8/2000 | Balachandran et al. |
| 6,141,533 A | 10/2000 | Wilson et al. |
| 6,154,659 A | 11/2000 | Jalali et al. |
| 6,181,738 B1 | 1/2001 | Chheda et al. |
| 6,222,832 B1 | 4/2001 | Proctor |
| 6,285,887 B1 | 9/2001 | Mimura |
| 6,298,241 B1 | 10/2001 | Hong |
| 6,301,238 B1 | 10/2001 | Hagerman et al. |
| 6,307,844 B1 | 10/2001 | Tsunehara et al. |
| 6,356,538 B1 | 3/2002 | Li |
| 6,393,276 B1 | 5/2002 | Vanghi |
| 6,396,867 B1 | 5/2002 | Tiedemann, Jr. et al. |
| 6,400,960 B1 | 6/2002 | Dominique et al. |
| 6,434,365 B1 | 8/2002 | Knutson et al. |
| 6,456,604 B1 | 9/2002 | Lee et al. |
| 6,466,563 B1 | 10/2002 | Yamada |
| 6,480,476 B1 | 11/2002 | Willars |
| 6,480,481 B1 * | 11/2002 | Park ..................... H04W 52/38 370/318 |
| 6,529,740 B1 | 3/2003 | Ganucheau, Jr. et al. |
| 6,587,697 B2 | 7/2003 | Terry et al. |
| 6,633,558 B1 | 10/2003 | Cho et al. |
| 6,643,318 B1 * | 11/2003 | Parsa .................. H04B 1/7103 370/335 |
| 6,693,951 B1 | 2/2004 | Gilhousen et al. |
| 6,711,150 B1 | 3/2004 | Vanghi |
| 6,717,916 B1 | 4/2004 | Ahn et al. |
| 6,728,551 B2 | 4/2004 | Chang |
| 6,741,614 B1 * | 5/2004 | Porter .................. H04B 7/2681 370/332 |
| 6,754,505 B1 | 6/2004 | Baker et al. |
| 6,853,844 B2 | 2/2005 | Iwamura |
| 6,928,066 B1 | 8/2005 | Moon et al. |
| 7,062,287 B2 | 6/2006 | Nakamura et al. |
| 7,079,522 B1 | 7/2006 | Kim et al. |
| 7,342,355 B2 | 3/2008 | Seo et al. |
| 8,155,096 B1 | 4/2012 | Proctor, Jr. |
| 8,605,702 B2 | 12/2013 | Proctor, Jr. et al. |
| 9,806,850 B2 | 10/2017 | Lv et al. |
| 2001/0006898 A1 | 7/2001 | Bae |
| 2001/0012276 A1 | 8/2001 | Tsunehara et al. |
| 2001/0026543 A1 | 10/2001 | Hwang et al. |
| 2001/0053140 A1 | 12/2001 | Choi et al. |
| 2002/0002058 A1 | 1/2002 | Hamabe |
| 2002/0025811 A1 | 2/2002 | Willey |
| 2002/0027946 A1 | 3/2002 | Ozluturk |
| 2002/0027959 A1 | 3/2002 | Haim |
| 2002/0080024 A1 | 6/2002 | Nelson, Jr. et al. |
| 2002/0111183 A1 | 8/2002 | Lundby |
| 2002/0136192 A1 | 9/2002 | Holma et al. |
| 2002/0165004 A1 | 11/2002 | Chen et al. |
| 2003/0043778 A1 | 3/2003 | Luschi et al. |
| 2003/0064744 A1 | 4/2003 | Zhang et al. |
| 2003/0123382 A1 | 7/2003 | Wang et al. |
| 2003/0228865 A1 | 12/2003 | Terry |
| 2004/0043784 A1 | 3/2004 | Czaja et al. |
| 2004/0190475 A1 | 9/2004 | Hamalainen et al. |
| 2004/0190600 A1 | 9/2004 | Odenwalder |
| 2004/0190699 A1 | 9/2004 | Doherty et al. |
| 2004/0233889 A1 * | 11/2004 | Fujita ................... H04B 1/7183 370/350 |
| 2005/0003848 A1 | 1/2005 | Chen et al. |
| 2005/0255872 A1 | 11/2005 | Lundell et al. |
| 2011/0047430 A1 | 2/2011 | Feuersaenger et al. |
| 2012/0257509 A1 | 10/2012 | Natarajan et al. |
| 2016/0234817 A1 | 8/2016 | Koyanagi et al. |

FOREIGN PATENT DOCUMENTS

| | | |
|---|---|---|
| EP | 1 126 635 | 8/2001 |
| EP | 1 215 926 | 6/2002 |
| JP | 11-041203 | 2/1999 |
| JP | 2002-280930 | 9/2002 |
| WO | 99/67899 | 12/1999 |
| WO | 00/62456 | 10/2000 |
| WO | 02/009311 | 1/2002 |
| WO | 02/041522 | 5/2002 |
| WO | 02/065667 | 8/2002 |

OTHER PUBLICATIONS

InterDigital, Proposed CR 194 to 25.331 on DPCH Uplink Outer Loop Power Control SIR Setting in TDD Mode, 3GPP TSG-RAN WG2 #11, R2-00358, Torino, Italy, Feb. 28-Mar. 3, 2000.

Samsung et al., "HS-DPCCH power control using the special pilot bits in HS-DPCCH (Revision of R1-020562)," 3GPP TSG-RAN WG1 #25, R1-02-0636, Paris, France, (Apr. 9-12, 2002).

Samsung, "Impact of separate power control of HS-DPCCH on UL DPDCH performance," 3GPP TSG-RAN WG1 #26, R1-02-0764, Gyeongju, Korea (May 13-16, 2002).

Samsung, "UL Power Control for HSDPA," 3GPP TSG-RAN WG1 #23, R1-02-0033, Espoo, Finland (Jan. 8-11, 2002).

Telecommunications Industry Association, "TIA/EIA Interim Standard, Mobile Station-Base Station Compatibility Standard for Dual-Mode Wideband Spread Spectrum Cellular System, TIA/EIA/IS-95-A (Revision of TIA/EIA/IS-95)," (May 1995). (Due to the size of this document, it is submitted in 3 parts.).

Telecommunications Industry Association, "TIA/EIA Standard, Mobile Station-Base Station Compatibility Standard for Wideband Spread Spectrum Cellular Systems, TIA/EIA-95B (Upgrade and Revision of TIA/EIA-95A)," (Mar. 1999).

Third Generation Partnership Project 2, "cdma2000 High Rate Packet Data Air Interface Specification," 3GPP2 C.S0024, Version 2.0 (Oct. 27, 2000).

Third Generation Partnership Project 2, "Medium Access Control (MAC) Standard for cdma2000 Spread Spectrum Systems," 3GPP2 C.S0003-0, Version 1.0 (Oct. 1999).

Third Generation Partnership Project 2, "Medium Access Control (MAC) Standard for cdma2000 Spread Spectrum Systems, Release 0—Addendum 2," 3GPP2 C.S0003-0, Version 3.0 (Jun. 15, 2001).

Third Generation Partnership Project 2, "Physical Layer Standard for cdma2000 Spread Spectrum Systems," 3GPP2 C.S0002-0-2 Version 1.13 (Apr. 24, 2001).

(56) References Cited

OTHER PUBLICATIONS

Third Generation Partnership Project 2, "Physical Layer Standard for cdma2000 Spread Spectrum Systems," 3GPP2 C.S0002-0, Version 1.0 (Jul. 1999).
Third Generation Partnership Project 2, "Physical Layer Standard for cdma2000 Spread Spectrum Systems—Release 0," 3GPP2 C.S0002, Version 3.0 (Jun. 15, 2001).
Third Generation Partnership Project, "Technical Specification Group Radio Access Network; Physical layer procedures (FDD) (Release 1999)," 3GPP TS 25.214 v3.6.0 (Mar. 2001).
Third Generation Partnership Project, "Technical Specification Group Radio Access Network; Physical layer procedures (FDD) (Release 1999)," 3GPP TS 25.214 V3.10.0 (Mar. 2002).
Third Generation Partnership Project, "Technical Specification Group Radio Access Network; Physical layer procedures (FDD) (Release 4)," 3GPP TS 25.214 V4.0.0 (Mar. 2001).
Third Generation Partnership Project, "Technical Specification Group Radio Access Network; Physical layer procedures (FDD) (Release 4)," 3GPP TS 25.214 V4.4.0 (Mar. 2002).
Third Generation Partnership Project, "Technical Specification Group Radio Access Network; Physical layer procedures (FDD) (Release 5)," 3GPP TS 25.214 V5.0.0 (Mar. 2002).
Third Generation Partnership Project, "Technical Specification Group Radio Access Network; Physical channels and mapping of transport channels onto physical channels (FDD) (Release 1999)," 3GPP TS 25.211 V3.6.0 (Mar. 2001).
Third Generation Partnership Project, "Technical Specification Group Radio Access Network; Physical channels and mapping of transport channels onto physical channels (FDD) (Release 5)," 3GPP TS 25.211 V5.0.0 (Mar. 2002).
Third Generation Partnership Project, "Technical Specification Group Radio Access Network; Physical channels and mapping of transport channels onto physical channels (FDD) (Release 1999)," 3GPP TS 25.211 V3.10.0 (Mar. 2002).
Third Generation Partnership Project, "Technical Specification Group Radio Access Network; Physical channels and mapping of transport channels onto physical channels (FDD) (Release 4)," 3GPP TS 25.211 V4.4.0 (Mar. 2002).
Third Generation Partnership Project, "Technical Specification Group Radio Access Network; Physical channels and mapping of transport channels onto physical channels (FDD) (Release 4)," 3GPP TS 25.211 V4.1.0 (Jun. 2001).
Third Generation Partnership Project, "Technical Specification Group Radio Access Network; RRC Protocol Specification (Release 1999)," 3GPP TS 25.331 V3.6.0 (Mar. 2001).
Third Generation Partnership Project, "Technical Specification Group Radio Access Network; Radio Resource Control (RRC); Protocol Specification (Release 1999)," 3GPP TS 25.331 V3.10.0 (Mar. 2002).
Third Generation Partnership Project, "Technical Specification Group Radio Access Network; RRC Protocol Specification (Release 4)," 3GPP TS 25.331 V4.0.0 (Mar. 2001).
Third Generation Partnership Project, "Technical Specification Group Radio Access Network; Radio Resource Control (RRC); Protocol Specification (Release 4)," 3GPP TS 25.331 V4.4.0 (Mar. 2002).
Third Generation Partnership Project, "Technical Specification Group Radio Access Network; Radio Resource Control (RRC); Protocol Specification (Release 5)," 3GPP TS 25.331 V5.0.0 (Mar. 2002).
Third Generation Partnership Project, "Technical Specification Group Radio Access Network; Physical channels and mapping of transport channels onto physical channels (TDD) (Release 1999)," 3GPP TS 25.221 V3.6.0 (Mar. 2001).
Third Generation Partnership Project, "Technical Specification Group Radio Access Network; Physical channels and mapping of transport channels onto physical channels (TDD) (Release 4)," 3GPP TS 25.221 V4.0.0 (Mar. 2001).
Third Generation Partnership Project, "Technical Specification Group Radio Access Network; Physical channels and mapping of transport channels onto physical channels (TDD) (Release 4)," 3GPP TS 25.221 V4.4.0 (Mar. 2002).
Third Generation Partnership Project, "Technical Specification Group Radio Access Network; Physical channels and mapping of transport channels onto physical channels (TDD) (Release 5)," 3GPP TS 25.221 V5.0.0 (Mar. 2002).
Third Generation Partnership Project, "Technical Specification Group Radio Access Network; Multiplexing and channel coding (TDD) (Release 1999)," 3GPP TS 25.222 V3.60 (Mar. 2001).
Third Generation Partnership Project, "Technical Specification Group Radio Access Network; Multiplexing and channel coding (TDD) (Release 1999)," 3GPP TS 25.222 V3.80 (Mar. 2002).
Third Generation Partnership Project, "Technical Specification Group Radio Access Network; Multiplexing and channel coding (TDD) (Release 4)," 3GPP TS 25.222 V4.0.0 (Mar. 2001).
Third Generation Partnership Project, "Technical Specification Group Radio Access Network; Multiplexing and channel coding (TDD) (Release 4)," 3GPP TS 25.222 V4.3.0 (Mar. 2002).
Third Generation Partnership Project, "Technical Specification Group Radio Access Network; Multiplexing and channel coding (TDD) (Release 5)," 3GPP TS 25.222 V5.0.0 (Mar. 2002).
Third Generation Partnership Project, "Technical Specification Group Radio Access Network; Spreading and modulation (TDD) (Release 1999)," 3GPP TS 25.223 V3.5.0 (Mar. 2001).
Third Generation Partnership Project, "Technical Specification Group Radio Access Network; Spreading and modulation (TDD) (Release 1999)," 3GPP TS 25.223 V3.8.0 (Mar. 2002).
Third Generation Partnership Project, "Technical Specification Group Radio Access Network; Spreading and modulation (TDD) (Release 4)," 3GPP TS 25.223 V4.0.0 (Mar. 2001).
Third Generation Partnership Project, "Technical Specification Group Radio Access Network; Spreading and modulation (TDD) (Release 4)," 3GPP TS 25.223 V4.4.0 (Mar. 2002).
Third Generation Partnership Project, "Technical Specification Group Radio Access Network; Spreading and modulation (TDD) (Release 5)," 3GPP TS 25.223 V5.0.0 (Mar. 2002).
Third Generation Partnership Project, "Technical Specification Group Radio Access Network; Physical Layer Procedures (TDD) (Release 1999)," 3GPP TS 25.224 V3.6.0 (Mar. 2001).
Third Generation Partnership Project, "Technical Specification Group Radio Access Network; Physical Layer Procedures (TDD) (Release 1999)," 3GPP TS 25.224 V3.10.0 (Mar. 2002).
Third Generation Partnership Project, "Technical Specification Group Radio Access Network; Physical Layer Procedures (TDD) (Release 4)," 3GPP TS 25.224 V4.0.0 (Mar. 2001).
Third Generation Partnership Project, "Technical Specification Group Radio Access Network; Physical Layer Procedures (TDD) (Release 4)," 3GPP TS 25.224 V4.4.0 (Mar. 2002).
Third Generation Partnership Project, "Technical Specification Group Radio Access Network; Physical Layer Procedures (TDD) (Release 5)," 3GPP TS 25.224 V5.0.0 (Mar. 2002).
Third Generation Partnership Project, "Technical Specification Group Radio Access Network; RLC protocol specification (Release 1999)," 3GPP TS 25.322 V3.6.0 (Mar. 2001).
Third Generation Partnership Project, "Technical Specification Group Radio Access Network; Radio Link Control (RLC) protocol specification (Release 1999)," 3GPP TS 25.322 V3.10.0 (Mar. 2002).
Third Generation Partnership Project, "Technical Specification Group Radio Access Network; RLC protocol specification (Release 4)," 3GPP TS 25.322 V4.0.0 (Mar. 2001).
Third Generation Partnership Project, "Technical Specification Group Radio Access Network; Radio Link Control (RLC) protocol specification (Release 4)," 3GPP TS 25.322 V4.4.0 (Mar. 2002).
Third Generation Partnership Project, "Technical Specification Group Radio Access Network; Radio Link Control (RLC) protocol specification (Release 5)," 3GPP TS 25.322 V5.0.0 (Mar. 2002).
TIA/EIA Interim Standard, Physical Layer Standard for cdma2000 Spread Spectrum Systems, TIA/EIA/IS-2000-2 (Aug. 1999).

* cited by examiner

SYSTEM AND METHOD FOR COORDINATION OF WIRELESS MAINTENANCE CHANNEL POWER CONTROL

CROSS REFERENCE TO RELATED APPLICATIONS

This application is a continuation of U.S. patent application Ser. No. 13/615,848 filed on Sep. 14, 2012, which is a divisional of U.S. patent application Ser. No. 12/938,864 filed on Nov. 3, 2010, which is a divisional of U.S. patent application Ser. No. 10/170,015, filed on Jun. 11, 2002, which claims the benefit of U.S. Provisional Application No. 60/297,839 filed on Jun. 13, 2001, which is incorporated by reference as if fully set forth.

BACKGROUND

In a wireless communication system, a number of radio channels provide a connection between users and a central location, such as a base station or access point. In such a system, the wireless channels are a scarce resource which must typically be shared. In a Code Division Multiple Access (CDMA) system, a number of different channels can be transmitted on a single radio frequency carrier by applying different codes to each signal. However, even in a CDMA system, demand for access to channels is so great that the base station must allocate and switch the channels among multiple users.

Often, a wireless user may be switched on, but not actively sending or receiving data. Accordingly, wireless users may be in an "active" mode, and currently allocated a wireless data traffic channel for sending or receiving data, or in an "idle" mode, and not currently sending or receiving data. An idle user may, for example, have just sent or received a data traffic transmission and is therefore deemed likely to soon request a data traffic channel for further transmissions. A maintenance message may therefore be employed to maintain a user in a synchronized but idle state to facilitate allocation of a wireless traffic channel when needed. When a user requests a channel, the idle state allows the user to be allocated a wireless traffic channel more quickly than for a user who was not being maintained in a synchronized idle state. For more information concerning one way to implement a system, please refer to U.S. Pat. No. 6,222,832, entitled "Fast Acquisition of Traffic Channels for a Highly Variable Data Rate Reverse Link of a CDMA Wireless Communication System," assigned to Tantivy Communications, Inc., assignee of the present application.

A number of users, therefore, may be maintained in an idle state through a periodic sequence of maintenance messages. In the idle state, the maintenance messages typically provide time tracking and power control, and do not require phase reference information employed when in the active state. Time tracking and power control signaling requires less power than the maintenance messages sent during active data payload transmission. The maintenance messages, however, are typically sent at a similar power level during both the idle and active states. Accordingly, the maintenance messages can increase interference and battery power drain during the idle state.

SUMMARY

In a wireless communications system, synchronization maintenance messages are often employed to maintain a user in an idle state by providing time tracking and power control. According to the present invention, a method for controlling the power level of a wireless message which defines a maintenance channel operable to transmit synchronization maintenance messages (synchronization messages) includes determining the presence of data to be transmitted from a wireless access terminal to a base station. The power level of the synchronization message sent from the access terminal via the maintenance channel is adjusted depending on the presence of data to be sent. Synchronization messages for idle state synchronization provide time tracking and power control signaling, while synchronization messages corresponding to active data traffic transmissions also provide phase reference for the data traffic transmissions. The synchronization messages corresponding to the idle state employ a lower power level than the active state transmissions which employ a higher power level.

In this manner, the system monitors the presence of data and controls the power level accordingly such that synchronization messages are sent at a lower power level in the idle state, when no data is present, thereby reducing power consumption and interference.

More specifically, a data transmission state is maintained at the wireless access terminal to indicate the presence of data to transmit via a data traffic channel on a reverse link. The power level of a synchronization message is computed in response to the data transmission state. Target power levels are maintained for the idle state and the active state. The synchronization messages are sent from the access terminal to the base station at the corresponding power level. Power control messages (return messages) sent in response from the base station manage the power level towards the applicable target power level.

A maintenance channel connection is maintained for transmission of the synchronization messages. The maintenance channel typically transmits unmodulated, or pilot, signals for maintaining synchronization. Since the maintenance channel is not a dedicated data traffic channel, a plurality of access terminals may be maintained over a single maintenance channel using a plurality of time slots.

The synchronization messages are typically sent at predetermined intervals from each of the access terminals. In the idle state, synchronization messages are sent according to a gating rate. In the active state, synchronization messages are sent continuously in order to maintain a phase reference for a corresponding data traffic transmission. Return power control messages are sent in response to the synchronization messages including power control and time tracking information according to a power control group.

The access terminal determines the data transmission state, either ON (active) or OFF (idle), and adjusts transmission power accordingly. The base station, in turn, determines the data transmission state and adjusts information in the return messages accordingly to control the power level toward one of an active power control target and an idle power control target. Further, the access terminal disregards return messages for a predetermined interval after a change in the data transmission state to allow for recognition and adjustment of the data transmission state change by the base station. The target power level is determined by the base station using factors including the received signal strength, received signal quality, Carrier-to-Interference (C/I) ratio, and the Signal to Noise Ratio (SNR).

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

A description of preferred embodiments of the invention follows.

The wireless system as disclosed herein employs a reverse link maintenance channel for maintaining synchronization and other state information for a plurality of subscriber access terminals. The subscriber access terminals support users by providing a wireless link to a base station processor for communication with a data network such as the Internet. The wireless link is provided by one or more wireless channels managed by the base station. The wireless channels are dynamically allocated by the base station among the multiple access terminals depending on data transmission needs, and typically do not remain dedicated to a single user.

A maintenance channel, therefore, is employed to maintain an access terminal in synchronization with the base station when it is not actively sending data. Such a maintenance channel is capable of maintaining a plurality of access terminals at the same time. This synchronization allows an access terminal to be allocated a data traffic channel more readily when needed for data traffic transmission than that which would be required to set up and tear down a reverse link wireless channel each time the access terminal was to send or receive data messages.

Figure 1A:
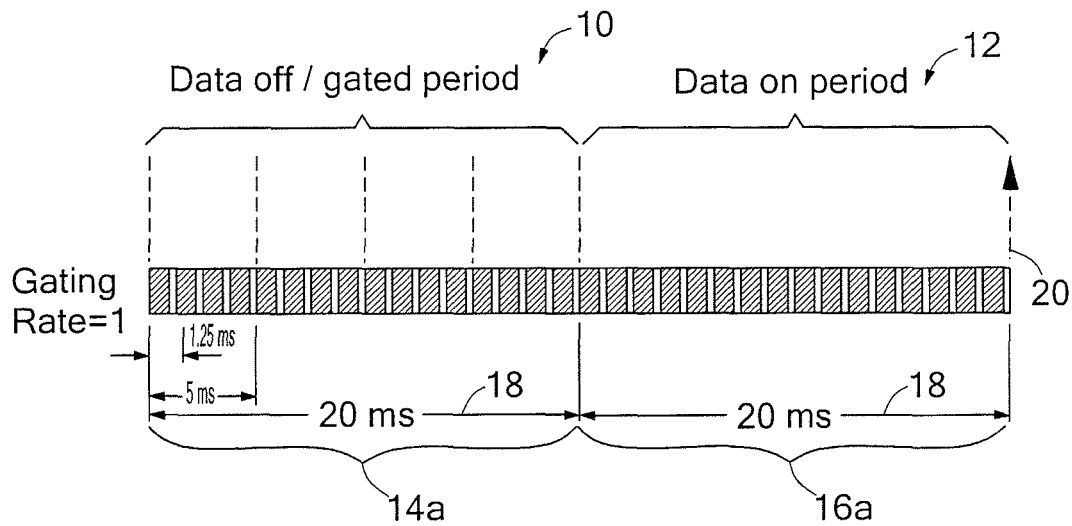
FIGS. 1a-1c are diagrams of prior art maintenance messages for a wireless maintenance channel.
Figure 1B:
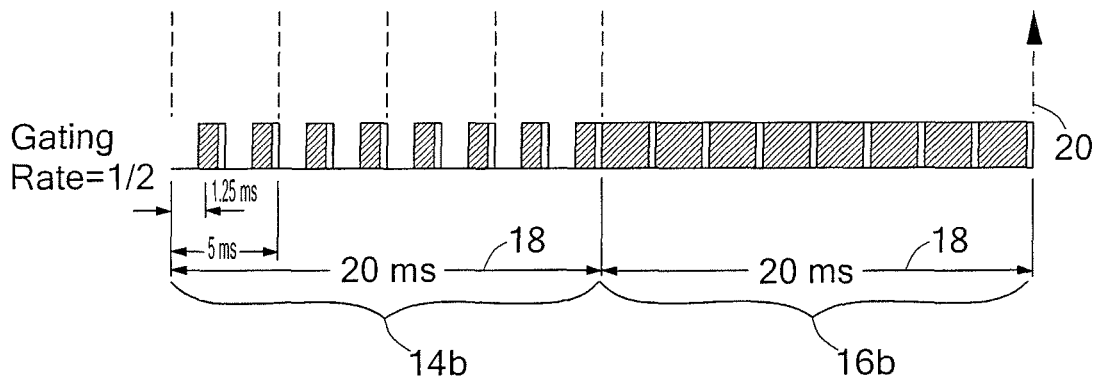
Figure 1C:
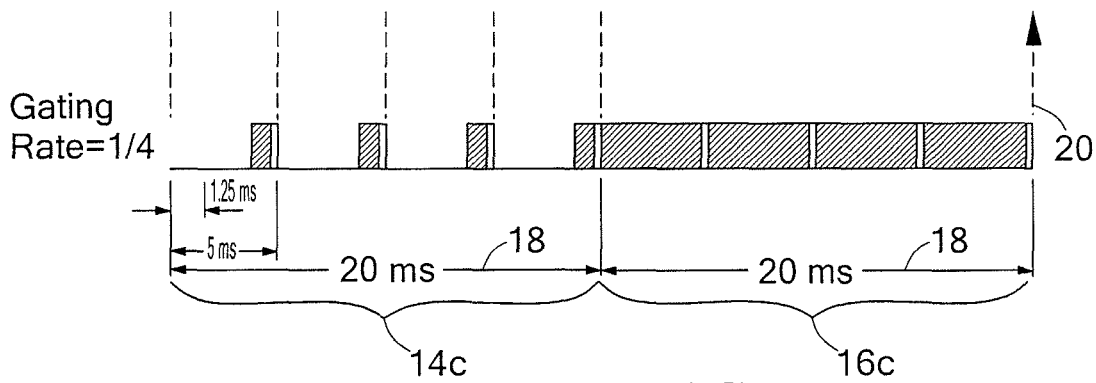

FIGS. 1a-1c show a diagram of several different types of maintenance messages used in the prior art. Referring to FIGS. 1a-1c, the power level of the maintenance messages are shown for three different gating rates—1, ½ and ¼, respectively. When an access terminal is in an idle state and not actively sending or receiving data, as shown by the "data off/gated" period 10, a maintenance message is sent to maintain time tracking and power control. The idle state message need not be continuous. It is sent in a time slotted or gated manner according to a gating rate 14a-14c, for the duration of a 20 ms power control group 18. As shown in FIGS. 1a-1c, respectively, several different gating rates have been used. During a "data on" period 12, the maintenance message is sent continuously, as shown by the continuous transmissions 16a-16c. However, during each power control group 18 gated messages are sent at the same power level, as shown by the power level on axis 20. As the maintenance messages sent during the data off period 10 are employed for time tracking and power control, they need not be sent at the same power level afforded to the maintenance messages sent during the data on period 12, which are used also for phase reference for a corresponding data traffic channel.

Figure 2:
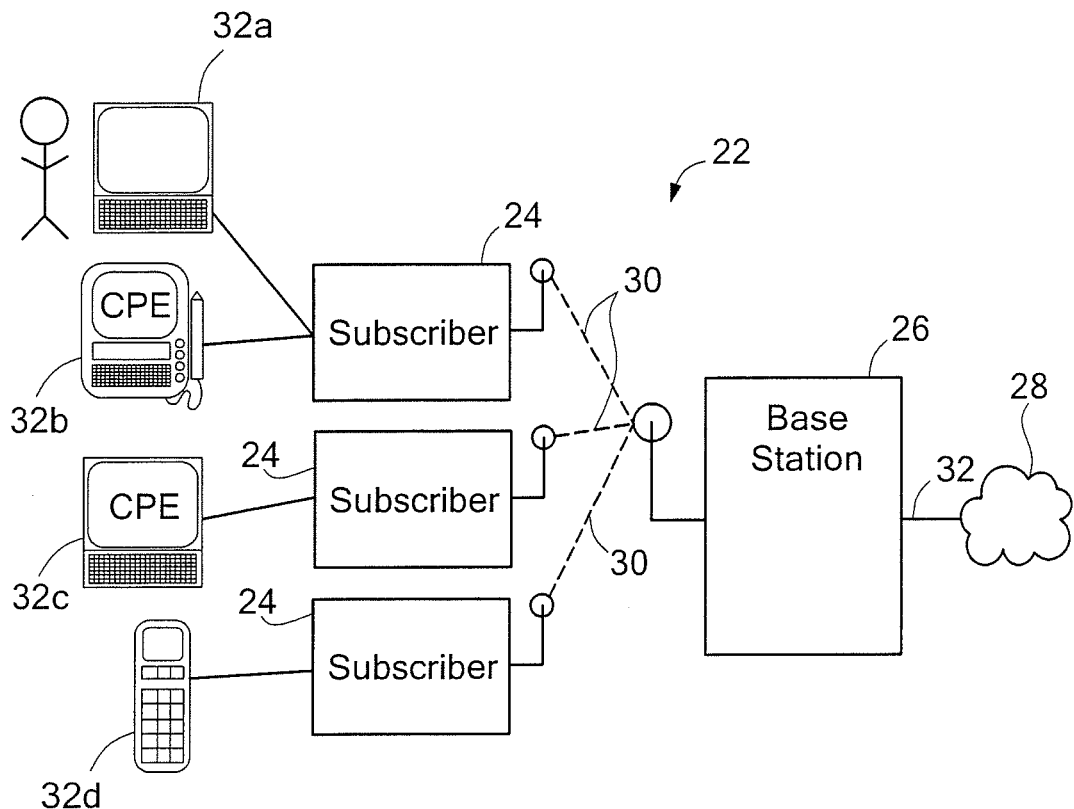
FIG. 2 is a diagram of a wireless communication system employing the invention as defined by the present claims.

FIG. 2 is a diagram of a wireless communication system 22 employing the invention as defined by the present claims A plurality of subscriber terminals 24 (access terminals) are in wireless communication with a base station processor 26 (base station) via wireless links 30. The base station 26 is also connected to the Internet 28 via a wired link 32 to act as a gateway for the access terminals 24. The access terminals 24 provide wireless Internet access to customer premises equipment (CPE) 32 generally, such as desktop PCs 32a, 32c, personal digital assistants (PDAs) 32b, wireless phones 32d, and other devices such as laptops, pagers, and automotive telematics devices, not shown. It should be noted that the wireless functionality provided by the access terminal 24 may be in a stand alone device such as a subscriber access unit or embedded in the CPE 32 unit. In either case the CPE is operable to communicate with the Internet 28 via the wireless link 30 and the base station 26.

Figure 3:
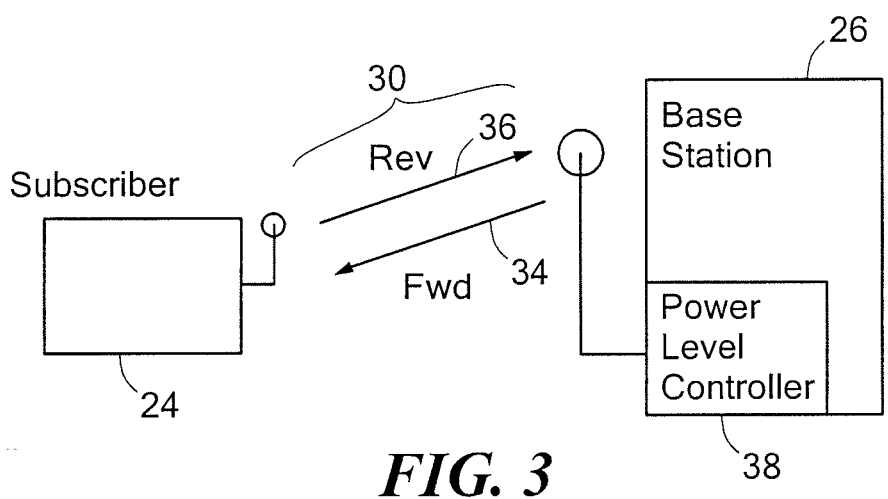
FIG. 3 shows the forward and reverse links between a wireless access terminal and a base station for message transmission.

FIG. 3 shows forward and reverse links between an access terminal and a base station for message transmission. Referring to FIGS. 2 and 3, the wireless links include both a forward link 34 and a reverse link 36 to permit duplex communication. The forward link supports wireless channels for carrying messages from the base station 26 to the access terminal 24, and the reverse link 36 supports wireless channels for carrying messages from the access terminal 24 to the base station.

Each of the access terminals 24 periodically sends a synchronization message via the reverse link 36 to the base station 26. The synchronization message includes time tracking and power control information sufficient to maintain the access terminal in at least an idle state, and therefore synchronized with the base station 26. The base station responds with a power control message via the forward link 34. The power control message includes power control commands to direct the power level of subsequent messages to allow the access terminal 24 to remain synchronized with the base station 26. The power level is determined by a power level controller 38 at the base station for computing a target power level for both the idle and active data transmission states.

The forward 34 and reverse 36 links further comprise data traffic channels for transmitting wireless messages having a data payload. The data traffic channels are allocated by the base station 26 to an access terminal 24 when the access terminal 24 is to send or receive data. A data transmission state, described further below, is indicative of whether the access terminal 24 is allocated a data traffic channel. When the data transmission state is active, the synchronization messages provide a phase reference for the messages transmitted on the data traffic channels, in addition to time tracking and power control.

Synchronization messages employed for only for time tracking synchronization and power control, however, do not require as much power as the synchronization messages used to provide phase reference during the active data transmission state. Therefore, according to the present invention, synchronization messages are sent at a reduced power level in the idle data transmission state. Additional power is provided for the synchronization message when it is also employed for phase reference. Accordingly, the synchronization messages are sent at a lower power level in the idle data transmission state than in the active data transmission state.

Figure 4:
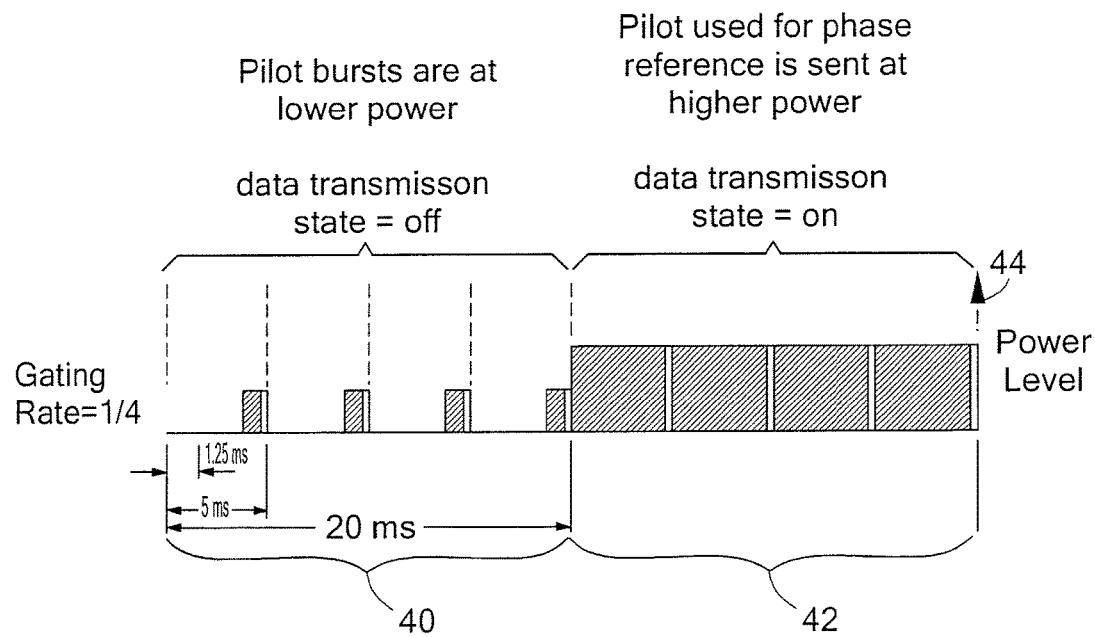
FIG. 4 is a diagram of wireless synchronization messages as defined by the present claims.

FIG. 4 is a power level diagram for the invention. Referring to FIGS. 4 and 2, during an idle (OFF) data transmission state 40, the synchronization messages are sent in a gated manner according to a gating rate. A gating rate of ¼ is shown as exemplary; other gating rates could be employed. The power level of the message is shown by the axis 44. When the data transmission state transitions to active (ON) 42, the power level 44 is increased to allow the synchronization messages to be employed for phase reference as well.

As indicated above, synchronization messages are transmitted at one of two power levels. The power level is managed by the base station 26 and transmitted to the access terminal 24 via the power control messages. The access terminal 24 responds by transmitting at the power level proscribed by the base station. The base station 26 computes a target power level, described further below, indicative of the power level at which the access terminal should transmit. Typically, the power level is expressed as effective radiated power in decibels (dB), however, other metrics could be employed. The base station, therefore, maintains target power levels for each of the data transmission states. An active target power level corresponds to the ON data transmission state and an idle target power level corresponds to the OFF data transmission state.

Figure 5:
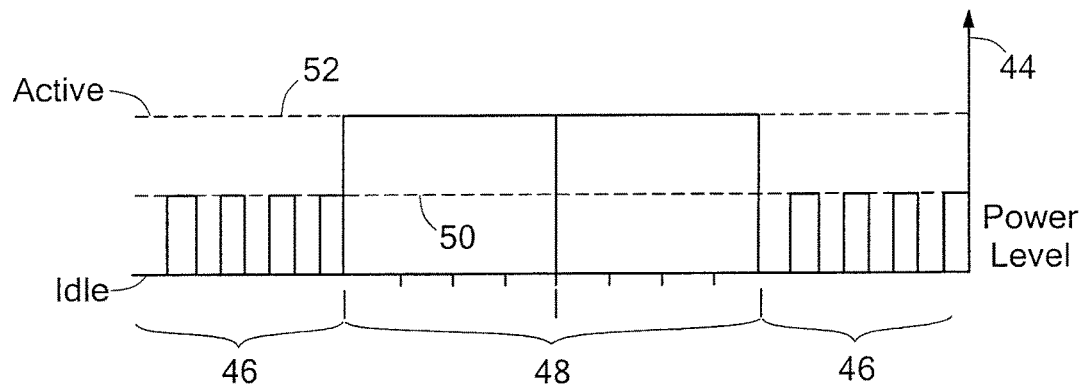
FIG. 5 shows idle and active power levels.

FIG. 5 shows idle and active power levels in more detail. Periods 46 correspond to OFF data transmission state, and period 48 corresponds to ON data transmission state. The power level 44 indicates the power level of the synchronization messages. The idle target power level, shown by dotted line 50, indicates the power level at which synchronization messages should be sent during OFF data transmission state. The active target power level, shown by dotted line 52, indicates the power level at which synchronization messages should be sent during ON data transmission state.

The access terminal 24 maintains the idle and active target power levels 50, 52. The base station 26 manages the transmission power of the messages sent by the access terminal 24 by the power control messages, which are sent by the base station 26 to adjust the idle and active target power levels 50, 52. The access terminal 24 determines when the data transmission state changes and toggles between the active and idle transmission power levels, and transmits according to the corresponding power level. The base station 26 determines a change in the data transmission state, described further below, and adjusts the power control messages accordingly.

While the data transmission state affects whether transmission occurs at the active or idle power level, other factors affect the perceived power level as well. The distance from the access terminal 24 to the base station 26, intervening objects, interference from other sources, and other factors all can affect the perceived power level of the wireless messages. Accordingly, the base station 26 examines the received signal quality, indicative of the power level of a received message, and computes the power control message accordingly. If a message from the access terminal 24 is being received at too low a perceived power level, the base station will transmit power control messages indicative of a higher power level at which to transmit. Similarly, if a message is received from the access terminal 24 at too high a perceived power level, the base station will transmit power control messages indicative of a lower power level at which to transmit. The base station, therefore, manages the power level of messages transmitted from the access terminal by focusing on a target power level.

Accordingly, when the access terminal 24 changes data transmission states, the base station will receive messages at a different power level. The base station determines that the change in power level is due to a change in data transmission state, and not to other factors described above, and continues to compute the idle and active power levels accordingly. Further, as the power control messages are typically sent according to power control groups of 16 every 20 ms, or every 1.25 ms, the base station may not determine the data transmission state until several power control message cycles. Accordingly, the access terminal 24 may disregard power control messages for a predetermined period after toggling data transmission states. The access terminal, therefore, may toggle between the active and idle power levels without the base station 26 countering with power control messages which would otherwise undermine the transmission of reduced power synchronization messages.

Figure 6:
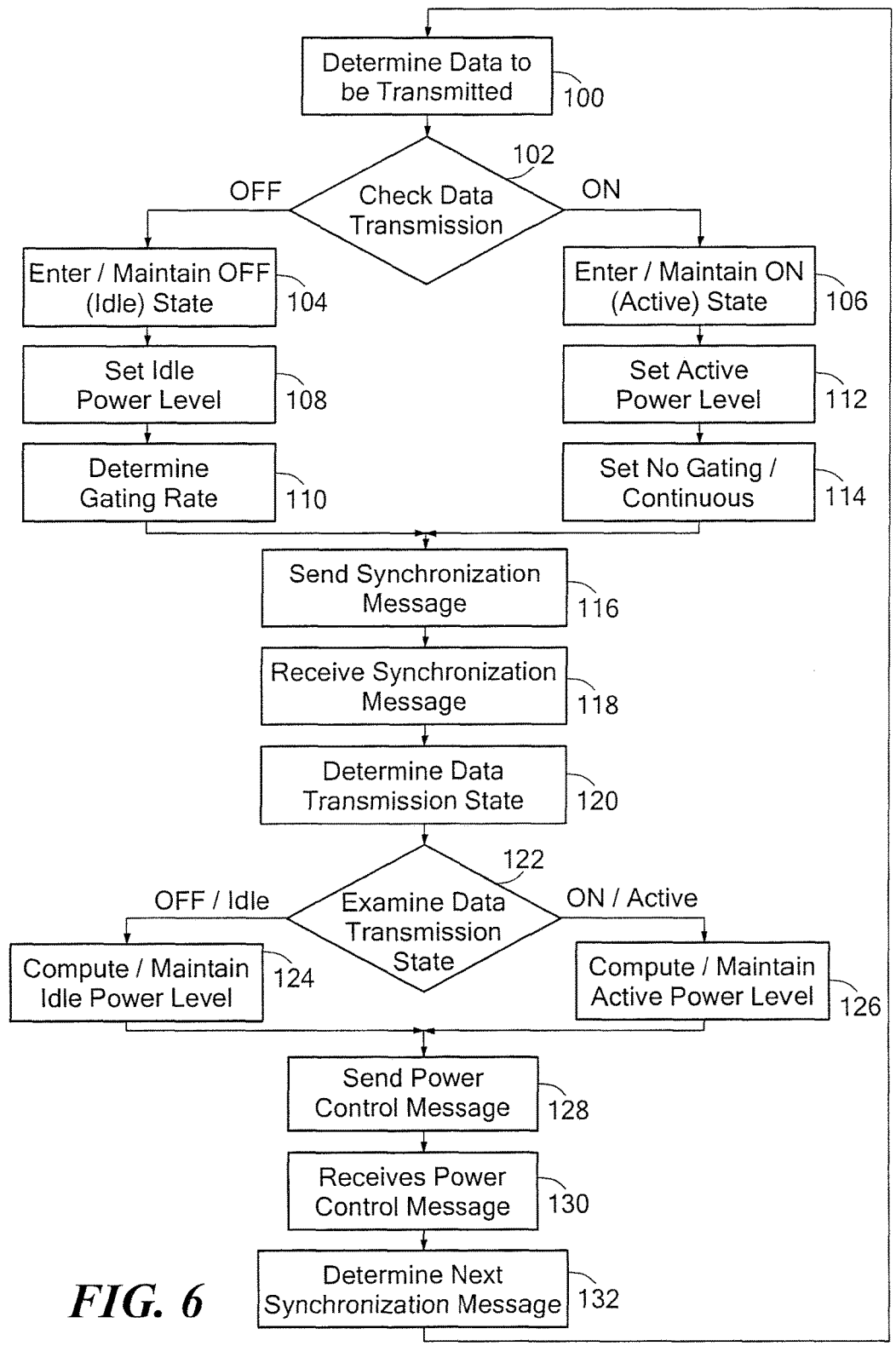
FIG. 6 is a flowchart of message transmission.

FIG. 6 is a flowchart of synchronization message transmission according to a particular embodiment of the invention. Referring also to FIG. 2 again, an access terminal 24 determines if there is data ready to be transmitted on a traffic channel, as depicted at step 100. A check is performed to set or maintain the data transmission state accordingly, as shown at step 102. If there is no data waiting to be transmitted, the access terminal 24 enters or maintains the data transmission state of idle, as depicted at step 104. If there is data waiting to be transmitted, the access terminal 24 enters or maintains the data transmission state of active, as shown at step 106.

In the idle data transmission state, the access terminal sets 24 the transmission power level at the idle target power level, as disclosed at step 108. The access terminal then determines the gating rate of the idle state message, as determined at step 110. In the idle mode, the message is sent in a gated, or periodic manner, such as ¼, ½, or 1. The gating rate results in a periodic delay, prior to sending the next synchronization message.

In the active data transmission state, the access terminal 24 set sets the transmission power level at the active target power level, as shown at step 112. The access terminal then sets the message as continuous, with no gating, as shown at step 114.

The access terminal 24 then sends a synchronization message to a base station 26, as depicted at step 116. The base station 26 receives the synchronization message, as disclosed at step 118, and determines the data transmission state, as shown at step 120.

Determination of the data transmission state is discussed further below with respect to FIG. 7. A check is performed to examine the determined data transmission state, as disclosed at step 122. If the data transmission state is idle, then the base station computes or maintains a new idle target power level, as depicted at step 124. If the data transmission state is active, then the base station computes a new active target power level, as shown at step 126. The base station 26 then sends a power control message indicative of the computed target power level to the access terminal 24, as shown at step 128.

The access terminal 24 receives the power control message, including the new target power level, as shown at step 130. The access terminal 24 then determines when to send the next synchronization message, depending on gating rate, as depicted at step 132, and control reverts to step 100.

In a gated manner, the access terminal 24 periodically sends the synchronization message depending on the gating rate. Accordingly, the access terminal 24 may wait for one or more power control group intervals of 1.25 ms each to elapse before sending the next synchronization message, as shown above in FIG. 4. Alternatively, in the active data transmission state, the synchronization messages are sent in a continuous manner, also as shown in FIG. 4.

Figure 7:
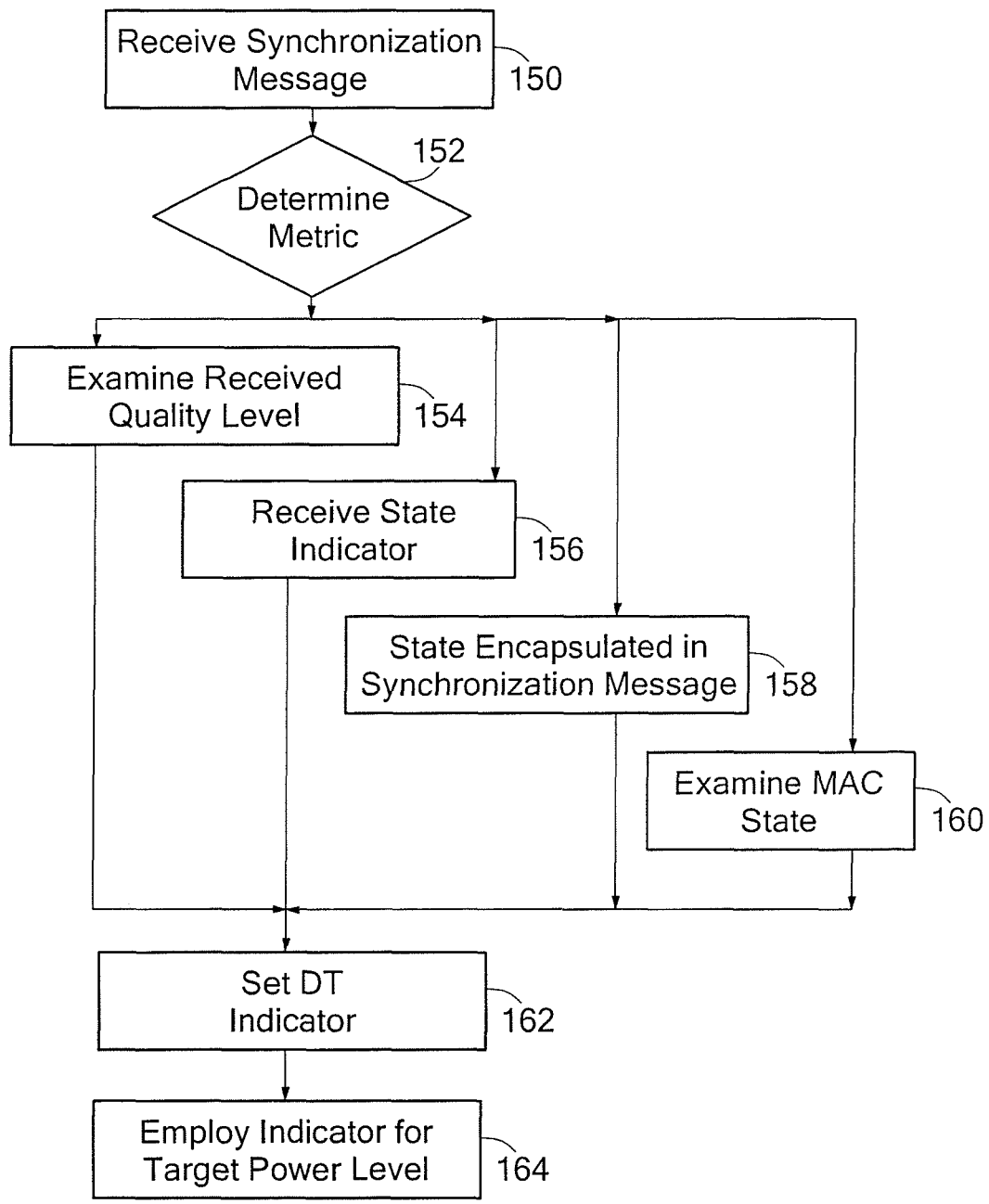
FIG. 7 is a flowchart of a power control loop for managing transmission power according to the target power levels.

FIG. 7 is a flowchart of a power control loop for managing transmission power according to the determined target power levels. Referring to FIG. 2 as well, the determination of the data transmission state is shown. The base station 26 receives the synchronization message from the access terminal 24, as shown at step 150. The base station determines which metric to employ to determine the data transmission state at the access terminal 24, as shown at step 152. As the access terminal toggles the data transmission state between active and idle, the base station determines the current data transmission state from the synchronization messages as they are received. The base station 26 then attempts to set the target power level reflected in the power control messages accordingly.

The base station 26 examines the received quality level of the synchronization message to determine the power level at which it was sent, and hence the data transmission state of either idle or active, as depicted at step 154. As indicated above, the access terminal 24 transmits at one of the idle or active power levels depending on the data transmission state. However, the base station 26 attempts to adjust the target power level such that access terminal transmissions are received uniformly at the base station 26. Accordingly, the base station 26 determines a transmission quality based on a link quality metric. Since the received quality level may be affected by other factors in addition to transmission power employed by the access terminal 24, such as noise, interference, and reflection, other metrics may be used to assess received signal quality and determine the sending power level.

Alternatively, the base station may receive a separate data transmission state indication according to a periodic interval, as shown at step 156. Such a predetermined interval may be according to the gating rate, or according to a predetermined interval agreed to by the base station and the access terminal, as described in U.S. patent application No. 60/346,527, entitled "Coordination of Pilot Power Level Based on Periodic Intervals", filed Jan. 8, 2002 and incorporated herein by reference.

The base station 26 may also receive the data transmission state encapsulated in the synchronization message, as shown at step 158. A detectable signal encapsulated in the synchronization message is detected by the base station, and employed to set the data transmission state, and the associated target power control level, at the base station 26 accordingly.

In another embodiment, the base station employs a MAC (media access control) state to determine the data transmission state, as disclosed at step 160. The MAC state transitions are indicated by a signal in the synchronization message. The base station detects the MAC state change, as described in U.S. patent application No. 60/346,525, entitled "Coordination of Pilot Power Level Based on MAC State", filed Jan. 8, 2002, incorporated herein by reference, and sets the data transmission state accordingly.

In alternate embodiments, other methods may be employed to detect a change in data transmission state at the base station 26. The base station 26 therefore, determines the data transmission state from the synchronization message, and sets its own indicator accordingly, as depicted at step 162. The indicator is employed in determining the target power level to set in the power control message, as disclosed at step 164. Other factors which affect the target power level include the C/I (Carrier to Interference) ratio or the SNR (Signal-to-Noise ratio), in addition to the received power level. Further discussion of power control messages and power control groups is disclosed in copending U.S. patent application Ser. No. 09/999,172, filed Nov. 30, 2001, entitled "Antenna Control System and Method", incorporated herein by reference. Once the target power level is determined, corresponding to a data transmission state of idle or active at the access terminal 24, control resumes at step 120 in FIG. 6.

Figure 8:
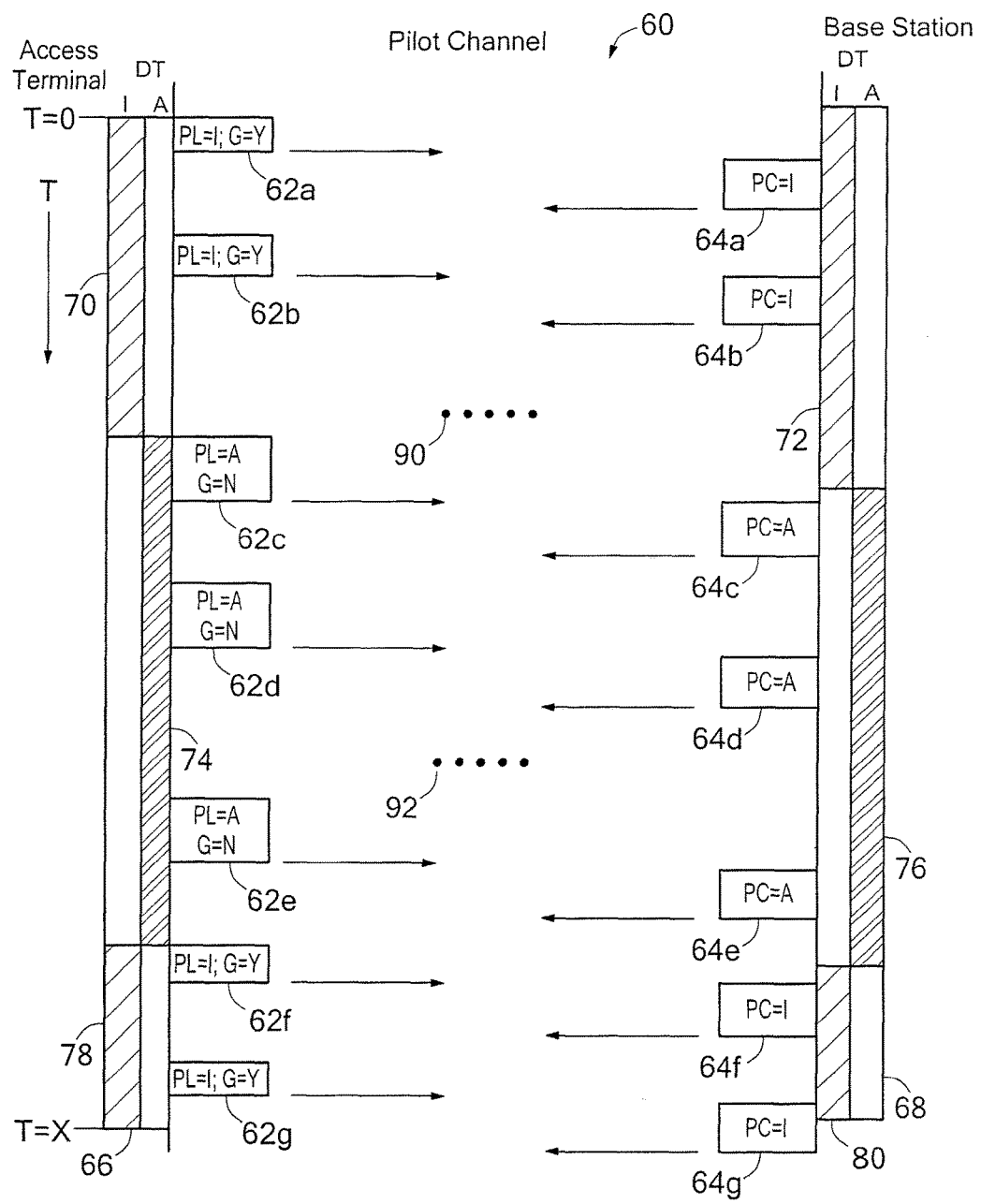
FIG. 8 is a message transmission sequence diagram showing the transition between data transmission states.

FIG. 8 is a message transmission sequence diagram showing a transition between data transmission states. A timing diagram 60 of a maintenance channel is shown. A plurality of synchronization messages 62a-62g are sent from an access terminal 24 to a base station 26. A complementary plurality of power control messages 64a-64g are sent from the base station 26 to the access terminal 24. The data transmission state (DT) at the access terminal 24 is shown by the hatched bars 66, and the DT state at the base station are shown by the hatched bars 68. At an initial time T=0, the DT state 66 at the access terminal 24 is idle (I), as shown by hatched area 70, and the DT state at the base station 26 is also idle for this user, as shown by hatched area 72. The synchronization message 62a is sent at a power level (PL) corresponding to the idle power level, and is sent in a gated (G=Y) manner since only synchronization information need be transmitted. The base station 26 responds with a power control message 64a indicating power control (PC) is to be maintained at the Idle level. The access terminal 24 receives the power control message 64a to maintain the Idle power level. The next synchronization message 62b is sent, also PL=I and G=Y, and the base station 26 responds with power control message 64b, PC=I. A series of idle state (DT=I) messages may continue, described above with respect to FIGS. 6 and 7, as shown by dotted line 90.

The access terminal 24 detects data present to be transmitted on a data traffic channel (not shown), and changes the DT state 66 to active (ON), as shown by hatched area 74. The synchronization message 62c is now transmitted at a power level of "A" (Active) and is sent in a constant (non-gated) manner G=N. Upon receiving the synchronization message, the base station 26 determines that there is data traffic present, and toggles the DT state 68 to A, as shown by hatched bar 76. The base station responds with power control message 64c, indicating power control is to target the active level (PC=A). The synchronization message 62d is transmitted at PL=A and G=N, and a power control message 64d is received for PC=A. A series of active state (DT=A) messages may continue, as described above with respect to FIGS. 6 and 7, as shown by dotted line 92. Synchronization message 62e is then sent, which corresponds to the last active state message in this sequence 62c-62e.

Power control message 64e is sent, and the access terminal 24 determines that there is currently no more data to transmit. Accordingly, the DT state 66 toggles to "I," (Idle) as shown by hatched area 78, and synchronization message 62f is sent, at PL=I and G=Y. The base station 26 receives the message 62f, determines that there is no data presently being transmitted, and toggles the DT state 68 to "I," as shown by hatched area 80. Power control message 64f is sent in response, at PC=I. Idle mode messages 62g and 64g follow in order, to continue the synchronization maintenance cycle, until the next active DT state.

The embodiment described above includes two power control levels of idle and active as illustrative. Multiple power level thresholds could be maintained between a access terminal 24 and a base station 26. Accordingly, the invention as described herein may be employed to provide multiple levels of standby or idle status, depending on the level of signaling capability employed at each level, for the purpose of minimizing interference and maintaining synchronization between an access terminal 24 and a base station 26.

Those skilled in the art should readily appreciate that the system and methods for synchronization message power control as defined herein are deliverable to a wireless device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable by a processor or as a set of instructions embedded in a carrier wave. Alternatively, the operations and methods may be embodied in whole or in part using hardware components, such as Application Specific Integrated Circuits (ASICs), state machines, controllers or other hardware components or devices, or a combination of hardware, software, and firmware components.

While this invention has been particularly shown and described with references to preferred embodiments thereof, it will be understood by those skilled in the art that various changes in form and details may be made therein without departing from the scope of the invention encompassed by the appended claims.

What is claimed is:

1. A subscriber unit comprising:
   an antenna;
   a circuit operatively coupled to the antenna, the circuit configured to transmit traffic data to a network on a first type of channel and control information to the network on a second type of channel that does not carry traffic data, wherein the control information is transmitted on the second type of channel in at least one second time period between a first time period in which traffic data is being transmitted on the first type of channel and a third time period in which traffic data is being transmitted on the first type of channel;
   wherein the circuit is further configured to transmit a quality level indicator on the second type of channel;
   wherein the circuit is further configured to receive first power commands for the first type of channel from the network and second power commands for the second type of channel from the network; and
   wherein the circuit is further configured to set a transmission power level for the first type of channel in response to the first power commands and not the second power commands and set a transmission power level for the second type of channel in response to the second power commands and not the first power commands.

2. The subscriber unit of claim 1, wherein the circuit is further configured to transmit an indication on the second type of channel that the subscriber unit has traffic data to send on the first type of channel.

3. The subscriber unit of claim 1, wherein the second type of channel is a maintenance channel.

4. The subscriber unit of claim 1, wherein the second type of channel is not transmitted continuously.

5. The subscriber unit of claim 1, wherein the transmission power level of the first type of channel after transmission of the second type of channel is based on first power commands received before and after transmission of the second type of channel.

6. The subscriber unit of claim 1, wherein the at least one second time period comprises a continuous transmission interval.

7. The subscriber unit of claim 1, wherein the at least one second time period comprises multiple transmission intervals.

8. The subscriber unit of claim 1, wherein the at least one second time period does not occur during the first time period or the third time period.

9. The subscriber unit of claim 1, wherein the first type of channel is a data traffic channel.

10. A method comprising:
    transmitting, by a subscriber unit, traffic data to a network on a first type of channel and control information to the network on a second type of channel that does not carry traffic data, wherein the control information is transmitted on the second type of channel in at least one second time period between a first time period in which traffic data is being transmitted on the first type of channel and a third time period in which traffic data is being transmitted on the first type of channel;
    transmitting, by the subscriber unit, a quality level indicator on the second type of channel;
    receiving, by the subscriber unit, first power commands for the first type of channel from the network and second power commands for the second type of channel from the network; and
    setting, by the subscriber unit, a transmission power level for the first type of channel in response to the first power commands and not the second power commands and a transmission power level for the second type of channel in response to the second power commands and not the first power commands.

11. The method of claim 10, further comprising:
    transmitting, by the subscriber unit, an indication on the second type of channel that the subscriber unit has traffic data to send on the first type of channel.

12. The method of claim 10, wherein the second type of channel is a maintenance channel.

13. The method of claim 10, wherein the second type of channel is not transmitted continuously.

14. The method of claim 10, wherein the transmission power level of the first type of channel after transmission of the second type of channel is based on first power commands received before and after transmission of the second type of channel.

15. The method of claim 10, wherein the at least one second time period comprises a continuous transmission interval.

16. The method of claim 10, wherein the at least one second time period comprises multiple transmission intervals.

17. The method of claim 10, wherein the at least one second time period does not occur during the first time period or the third time period.

18. The method of claim 10, wherein the first type of channel is a data traffic channel.

19. A network device comprising:
    an antenna,
    a circuit operatively coupled to the antenna, the circuit configured to receive traffic data from a subscriber unit on a first type of channel and control information from the subscriber unit on a second type of channel that does not carry traffic data, wherein the control information on the second type of channel is received in at least one second time period between a first time period in which traffic data is being received on the first type of channel and a third time period in which traffic data is being received on the first type of channel;

wherein the circuit is further configured to receive a quality level indicator on the second type of channel;

wherein the circuit is further configured to derive first power commands for the first type of channel and second power commands for the second type of channel; and wherein the circuit is further configured to transmit the first power commands and the second power commands to the subscriber unit.

20. The network device of claim 19, further comprising:

wherein the circuit is further configured to receive an indication on the second type of channel that the subscriber unit has traffic data to send on the first type of channel.

21. The network device of claim 19, wherein the second type of channel is a maintenance channel.

22. The network device of claim 19, wherein the second type of channel is not received continuously.

23. The network device of claim 19, wherein a transmission power level of the first type of channel after transmission of the second type of channel is based on first power commands received before and after transmission of the second type of channel.

24. The network device of claim 19, wherein the at least one second time period comprises a continuous transmission interval.

25. The network device of claim 19, wherein the at least one second time period comprises multiple transmission intervals.

26. The network device of claim 19, wherein the at least one second time period does not occur during the first time period or the third time period.

27. The network device of claim 19, wherein the first type of channel is a data traffic channel.

* * * * *